SELF-CLOSING CONTAINER

Original Filed Oct. 16, 1951

INVENTOR.
BENJAMIN STILLER
BY Ely & Frye
ATTORNEYS

United States Patent Office

Re. 24,166
Reissued June 12, 1956

24,166

SELF-CLOSING CONTAINER

Benjamin Stiller, Akron, Ohio

Original No. 2,667,906, dated February 2, 1954, Serial No. 251,477, October 16, 1951. Application for reissue February 1, 1956, Serial No. 562,918

8 Claims. (Cl. 150—37)

Matter enclosed in heavy brackets [ ] appears in the original patent but forms no part of this reissue specification; matter printed in italics indicates the additions made by reissue.

This invention relates to containers for coins, keys or the like and, in particular, to a one-piece construction having a slit in one face which responds to pressure applied lengthwise of the slit to provide a substantial opening for placing articles in the container or removing them therefrom.

Containers of this general nature have been proposed heretofore, but these have generally comprised such material as leather, entailed stitching, and required auxiliary springs for proper operation. *Representative containers of this general nature are illustrated in U. S. Letters Patent 2,125,354, issued on August 2, 1938, to A. J. Meier. In this type of container, auxiliary springs are used to effectuate the opening and closing movement. It is also to be noted that in the general field of containers the prior art has taught the use of unitary containers of resilient material of the type set forth in U. S. Letters Patents 2,086,378 and 2,278,088, issued respectively on July 6, 1932, and March 31, 1942, to H. E. Butler and P. G. Nelson. While these patents have found certain limited acceptability in the field of key containers, the same are incapable of utilization as a coin container for the reason that the slit portion thereof does not operate to expose the shallowest dimension of the container so that the coins can easily be withdrawn therefrom.*

I have found that a suitable and in every way satisfactory container may be constructed in one piece of a rubber-like material in a manner which involves only two essential steps, namely a dipping operation and a slitting operation. In addition to simplicity and ease and economy of manufacture, the container of this invention is rugged and durable, is pleasing in appearance, and may have a permanent color of any desired hue.

It is therefore a principal object of the invention to provide a one-piece, self-closing container. Further objects are to provide articles of this nature which are of simple construction and easy and economical of manufacture, and which are certain in operation and possessed of qualities of endurance in use.

The invention is illustrated in the accompanying drawings, in which.

Figure 1:
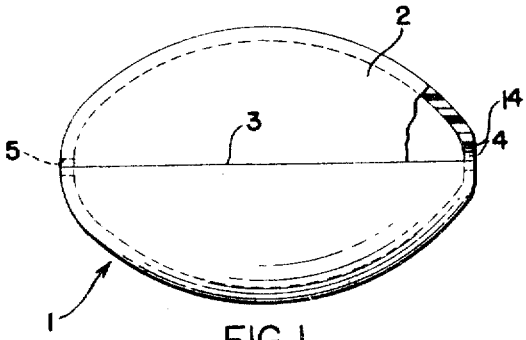
Fig. 1 is a top plan view of a container, partly broken away.

Referring to the drawings by characters of reference, there is shown a one-piece container generally elliptical in plan, indicated generally by the numeral 1, which is formed of a rubber-like material, preferably a so-called "paste" resin, a liquid which is not cured in the sense that rubber is, but is nevertheless brought to final form by heating. In particular, I employ the resin known as "Geon" paste, No. 121, manufactured by the B. F. Goodrich Co.

Figure 3:
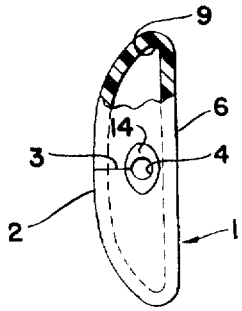
Fig. 3 is an elevational view of the container of Fig. 1, as seen from the right of that figure, and partly broken away.
Figure 2:
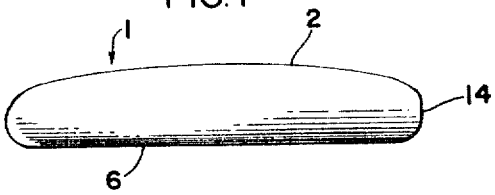
Fig. 2 is an elevational view of the container of Fig. 1, as seen from below that figure.

[As seen in Figs. 2 and 3, the container, or pouch, has a domed side 2, in the form of a portion of an ellipsoid, which is the side through which access is had to the interior.]

*Referring to Figures 2 and 3, the container or pouch is shown as being of generally flat hollow form so as to be defined by lateral surfaces or faces 2 and 6 that are shown as being ellipsoid in plan, with the surface 2 being illustrated as being slightly dome-shaped to facilitate access to the interior of the container.* For this purpose, the face 2 is provided with a through slit 3 coextensive with the major axis of the elliptical pouch. At its ends, the slit communicates with circular openings 4 and 5 with axes parallel to the major axis of the pouch.

The bottom *face* 6 of the pouch is preferably flat, but this may also be curved in any desired manner. For instance, if bottom [side] *face* 6 is to be imprinted, it will be of some help if this side is bowed outwardly.

In a preferred form, the article has a major axis of about 3 inches and a minor axis of about 2¼ inches.

*For the sake of convenience in description the bottom face 6, together with the peripheral upturned edge defined by the portion 9, may be considered as a resilient tray that has integrally secured thereto a resilient cover in the form of face 2 that includes the slit 3 extending thereacross as shown in Figure 1.*

Figure 4:
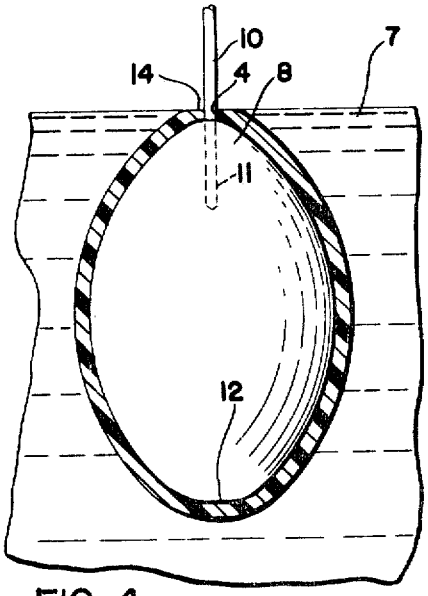
Fig. 4 is an elevational view of the container being formed on a mandrel in a dipping operation.

As seen in Fig. 4, the first step in forming the pouch is by dipping, in a quantity of the liquid plastic 7, a mandrel 8 having the form desired in the completed article. That is, generally elliptical in plan and having an ellipsoidal surface on one or both sides. The mandrel also has a rounded periphery to produce a correspondingly rounded interior portion 9 in the completed article.

For the dipping process, the mandrel is provided with a suspending rod 10 secured to the mandrel in any suitable manner, as by molding in place, so that the lower portion 11 is secured in the mandrel. Other portions of the suspending mechanism, adapted for dipping a plurality of mandrels at one time, form no part of the present invention and, therefore, need not be illustrated herein.

In order to accelerate pick-up of the paste during the dip, the mandrels are preheated to about 500° F., before dipping. The mandrels are inserted slowly into the bath 7, which is at room temperature, and slowly removed.

In a single dip of about 20 seconds duration, a coating about 7/64 inch in thickness is picked up. The coated mandrel is removed from the bath and placed in an oven at 500° F., where the coated material is conditioned to dryness in about 2 minutes. After removal from the oven, the articles are cooled by dipping in water, being removed therefrom as soon as practicable so that there is no undue loss of heat from the mandrels, which must subsequently be raised again to 500° F. After cooling, the coated mandrels are removed individually from the dipping rack for slitting and perforation. First, the end of the pouch is presented to a drill for formation of the opening 5, after which the slit 3 is made by a sharp knife in any convenient manner, employing a jig for instance, and the slit is started at one end, at opening 5 for instance, and is continued along the domed side 2 until it communicates with the other opening 4. Opening 4 is formed by the suspending rod 10 and is preferably located medially of the edge of the pouch, as seen in Fig. 3. Opening 5 could be formed by a rod extending from the mandrel on the end opposite rod 10, but it has been found that the fluid plastic tends to build up on such an extension to provide an objectionable hump. Therefore, it has been deemed preferable to form opening 5 with a drill or similar tool prior to the slitting operation. It has been found that this drilling is facilitated if a flat spot 12 is provided on the end of the mandrel.

Openings 4 and 5 have three important functions. They assist materially in the ready initiation of opening of the slit, they allow for a more expansive opening than would be possible with a slit alone, and they prevent tearing at the ends of the slit, which would destroy the usefulness of the article. It should be noted further that at least one of the holes is formed as an incident to the manner of attachment of the suspending mechanism, and therefore requires no extra manufacturing effort.

In the dipping operation, if the mandrel is inserted too deep in the bath, the material will build up on the suspending rod 10, resulting in an unsightly extension on the end of the pouch which would have to be buffed or cut off. This happens even when the top of the mandrel is located below the level of plastic 7 a distance equal to the desired thickness of the pouch. Therefore, the mandrel is located slightly higher than this position. As a result, the upper end of the pouch has a flat area 14 (shown somewhat exaggerated in the drawing), and there is no build-up around rod 10 to produce a ragged edge. This construction does not materially reduce the thickness of the pouch at the end.

As seen in Fig. 3, the arch of the pouch [has] *may have* a reduced curvature at the keystone region, near the slit, being nearly flat. It has been found that this feature provides more secure closing of the slit and minimizes accidental opening and resultant escape of contents. Even greater security is provided if this area be recessed slightly so that its curvature is negative with respect to that of the arch as a whole.

Figure 5:
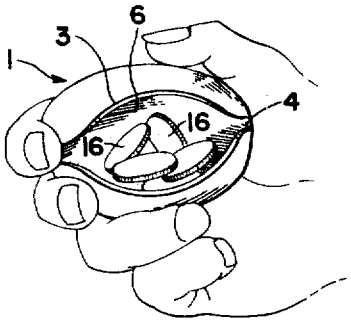
Fig. 5 is a view showing the container being manipulated to open position by hand.

The pouch may be opened by mere pressure of two fingers, applied at the opposite ends of the major axis of the pouch. However, it has been found most convenient to handle the pouch by a hand grasp in the manner illustrated in Fig. 5, wherein the pouch is shown as containing coins 16. With the pouch thus open, the desired coins may be easily selected and withdrawn, or the entire contents may be dumped into the other hand, and subsequently back into the pouch. The pouch shown may hold up to several dollars in change.

It is to be emphasized that forming of the slit 3 in a cutting operation is preferable to formation of the slit by mandrel appendages in the dipping operation, since in the latter case the fluid plastic builds up in mounds in the region of the slit, which must be buffed off, since the smooth contour of the article would otherwise be lost, and the opening and closing operations would not be dependable in their functioning.

While I prefer to employ a resin paste, obviously the article could be made of rubber, natural or synthetic, or any other material having elastic properties similar to those of rubber. Likewise, although I have shown the article as being formed in a dipping process, it may be formed on a mandrel by other means, such as spraying, electrodeposition, or moulding.

While a certain, preferred embodiment of the invention has been shown and described, the invention is not limited thereto, since various changes may be made without departing from the spirit or scope of the appended claims.

What is claimed is:

1. A quick-opening and self-closing container for articles comprising a unitary envelope of material having elastic properties similar to those of soft rubber, said envelope defining a substantially fully closed interior volume having a depth relatively small in comparison to dimensions transverse to its depth, and said envelope having a substantially transverse normally closed slit in one face extending from one periphery to an opposite periphery.

2. A quick-opening and self-closing container for articles comprising a unitary envelope of material having elastic properties similar to those of soft rubber, said envelope defining a substantially fully closed interior volume having a depth relatively small in comparison to dimensions transverse to its depth, and said envelope having a substantially transverse normally closed slit in one face extending from one periphery to an opposite periphery, the face bearing said slit being arched.

3. A quick-opening and self-closing container for articles comprising a unitary envelope of material having elastic properties similar to those of soft rubber, said envelope defining a substantially fully closed interior volume having a depth relatively small in comparison to dimensions transverse to its depth, and said envelope having a substantially transverse normally closed slit in one face extending from one periphery to an opposite periphery, said envelope having oppositely disposed, through apertures, and the respective ends of said slit communicating with respective apertures.

4. A container for articles comprising a unitary envelope of material having elastic properties similar to those of soft rubber, said envelope defining a substantially fully closed interior volume having a depth relatively small in comparison to dimensions transverse to its depth and being generally elliptical in plan, said envelope having at least one side arched, the top region of said arched side having a curvature of less magnitude than the balance of said arched side, and said one side having a normally closed through slit coextensive with the major axis of said envelope.

5. A quick-opening and self-closing container for articles comprising a unitary envelope of material having properties similar to those of soft rubber, said envelope defining a substantially fully closed interior volume and having a depth relatively small in relation to dimensions transverse to its depth, said envelope having oppositely disposed through apertures and a normally closed through slit in one face extending from one aperture to the other aperture, and said face being substantially flat in the region of said slit.

*6. A quick-opening and self-closing container for articles comprising: a unitary envelope of rubber material formed in substantially flat configuration, said envelope defining a substantially fully closed interior volume bounded by opposed wall sections of said envelope merging together at their peripheral edges and spaced apart interiorly of said merged peripheral edges with the distance between said wall sections being relatively small in comparison to the lateral dimension thereof; one of said wall sections having a normally closed slit extending transversely thereof between a pair of apertures in said wall section with at least one of said apertures being provided in the merged peripheral edge thereof.*

*7. A hollow body of resilient material formed in substantially flat configuration and being defined by a pair of spaced lateral walls merging together at their peripheries to define an integral edge portion; said edge portion having a pair of opposed apertures extending therethrough; said apertures being located adjacent the ends of the maximum transverse dimension of said lateral walls; one of said lateral walls having a normally closed slit that interconnects said opposed apertures, whereby the application of end pressure adjacent said apertures will cause said lateral wall having said slit to open along said slit to expose and render accessible substantially all of the internal surface of said opposed lateral wall.*

*8. A coin container of the character described, comprising; a resilient shallow tray portion of rubbery material comprising a bottom wall and an upturned peripheral edge; a resilient cover integral with said edge and defining therewith a hollow body of shallow depth; said cover having a normally closed slit across its maximum transverse dimension; said slit extending from one periphery to an opposite periphery.*

(References on following page)

References Cited in the file of this patent or the original patent

UNITED STATES PATENTS

| | | |
|---|---|---|
| 805,260 | Collan | Nov. 21, 1905 |
| 820,067 | Richardson | May 8, 1906 |
| 1,229,906 | Decker | June 12, 1917 |
| 1,527,830 | Booker | Feb. 24, 1925 |
| 1,699,614 | Fairbairn | Jan. 22, 1929 |
| 1,756,048 | Williams | Apr. 29, 1930 |
| 1,870,775 | Gammeter | Aug. 9, 1932 |
| 2,086,378 | Butler | July 6, 1937 |
| 2,125,354 | Meier | Aug. 2, 1938 |
| 2,171,730 | Lobl | Sept. 5, 1939 |
| 2,273,906 | Spanel | Feb. 24, 1942 |
| 2,546,413 | Williams | Mar. 27, 1951 |
| 2,667,906 | Stiller | Feb. 2, 1954 |

Disclaimer

Reissue No. 24,166.—*Benjamin Stiller*, Akron, Ohio. SELF-CLOSING CONTAINER. Reissue patent dated June 12, 1956. Disclaimer filed May 8, 1969, by the assignee, *Quikey Manufacturing Company*.

Hereby enters this disclaimer to claim 6 of said patent.

[*Official Gazette October 14, 1969.*]